2,820,039
1-(γ-BUTOXYPHENYL)-3-(γ-PYRIDYLPHENYL)-2-THIOUREAS

Leonard Doub, Pontiac, and David R. Herbst, Detroit, Mich., assignors to Parke, Davis & Company, Detroit, Mich., a corporation of Michigan No Drawing. Application March 5, 1956
Serial No. 569,256

6 Claims. (Cl. 260—394.8)

This invention relates to 1-(p-butoxyphenyl)-3-(p-pyridylphenyl)-2-thioureas and to methods for producing the same. More particularly, the 1-(p-butoxypheny)-3-(p-pyridylphenyl)-2-thioureas with which the invention is concerned have the following formula,

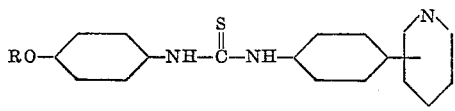

where R is a normal butyl or isobutyl group.

In accordance with the invention the new 1-(p-butoxyphenyl)-3-(p-pyridylphenyl)-2-thioureas are produced by reacting a butoxyphenyl compound of formula,

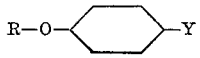

with a pyridylphenyl compound of formula,

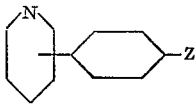

in a neutral organic solvent; where R has the above-mentioned significance, Y represents a primary amino group and Z an isothiocyanate group or Y represents an isothiocyanate group and Z represents a primary amino group. As solvents for the reaction alcohols such as methanol and ethanol, aromatic hydrocarbons such as benzene and toluene, ketones such as acetone, ethers such as dioxane and the like can be used. The reaction is carried out at a temperature below about 110° C. and preferably at a temperature between 20 and 50° C. In general, it is preferable to employ approximately equivalent amounts of the two reactants although small excesses of either reactant do not have an adverse effect upon the reaction.

The products of the invention are highly bacteriostatic against the organism responsible for tuberculosis. They are of value in treatment of tuberculosis particularly when used in conjunction with bactercidal anti-tuberculosis agents such as streptomycin, dihydrostreptomycin and the like. In most instances, a daily dosage of about 1 to 3 grams by the oral route is used. The products possess a very low degree of toxicity and this coupled with their high bacteriostatic activity renders them superior to p-aminosalicyclic acid and other agents of this type. For the above purposes, the 1-(p-isobutoxyphenyl)-3-(p-pyridylphenyl)-2-thioureas are preferred.

The invention is illustrated by the following examples.

Example 1

290 g. of p-n-butoxyphenyl isothiocyanate is added slowly with stirring to 238 g. of 2-p-aminophenylpyridine in 750 ml. of methanol. During the addition the temperature rises to about 35° C. After about fifteen minutes a cream colored solid starts to separate and the reaction mixture solidifies about five minutes later. The reaction mixture is washed with 1500 ml. of petroleum ether, filtered and washed with fresh petroleum ether; yield 486 g.; M. P. 145–147° C. Recrystallization from boiling acetone (about 5 liters) to which warm benzine (about 700 ml.) has been added yields the desired 1-(p-n-butoxyphenyl)-3-(p-2'-pyridylphenyl)-2-thiourea in pure form, yield 334 g.; M. P. 148° C.

Example 2

280 g. of p-isobutoxyphenyl isothiocyanate is added slowly with stirring to 229.5 g. of 2-p-aminophenylpyridine in 900 ml. of methanol. The reaction temperature rises to about 35° C. and the crude product separates from the mixture in about fifteen minutes. The product is collected, washed with ether and dried; M. P. 142–145° C. The product is recrystallized by dissolving in about 4 liters of boiling acetone and adding warm benzine until the solution becomes cloudy. The mixture is cooled and the purified 1-(p-isobutoxyphenyl)-3-(p-2'-pyridyl)-2-thiourea collected; M. P. 149° C.

Example 3

3.6 g. of p-n-butoxyphenyl isothiocyanate is added slowly with stirring to 3 g. of 3-p-aminophenylpyridine in 60 ml. of ethanol and the resulting mixture heated under reflux for two hours. The reaction mixture is cooled, and the crude product collected. Recrystallization from alcohol yields the desired 1-(p-n-butoxyphenyl)-3-(p-3'-pyridylphenyl)-2-thiourea in pure form; M. P. 171–172° C.

Example 4

4.14 g. of p-n-butoxyphenyl isothiocyanate is added slowly with stirring to 3.41 g. of 4-p-aminophenylpyridine in 40 ml. of ethanol and the resulting solution refluxed for one hour. The reaction mixture is cooled and the crude product collected. Three recrystallizations from ethanol yield the pure 1-(p-n-butoxyphenyl)-3-(p-4'-pyridylphenyl)-2'-thiourea; M. P. 157–158° C.

Example 5

21.2 g. of p-2-pyridylphenyl isothiocyanate is added slowly with stirring to 16.5 g. of p-n-butoxyaniline in 150 ml. of methanol and the resulting mixture heated under reflux for one hour. The reaction mixture is cooled and the crude product collected. Recrystallization of the product from acetone-benzene mixture yields 1-(p-n-butoxyphenyl)-3-(p-2'-pyridylphenyl)-2-thiourea, which is identical with that produced by the method described in Example 1.

The p-aminophenylpyridines and p-butoxyanilines used as starting materials are known substances. The corresponding isothiocyanates can be prepared in a number of different ways. For example, they may be prepared by the procedure set forth in the following examples showing the preparation of p-n-butoxyphenyl isothiocyanate, p-isobutoxyphenyl isothiocyanate and p-2-pyridylphenyl isothiocyanate.

99.5 g. of p-n-butoxyaniline is added slowly with vigorous stirring to a mixture composed of 90 ml. of concentrated ammonium hydroxide and 54 g. of carbon disulfide keeping the temperature below 15° C. The yellow precipitate which forms is ammonium p-n-butoxyphenyl dithiocarbamate. The mixture is stirred for one hour while allowing the temperature to rise to room temperature. 800 ml. of water is added, the mixture filtered and the filtrate treated with 227.5 g. of lead acetate trihydrate in 750 ml. of water keeping the temperature below 40° C. The mixture is stirred for one hour, filtered and the precipitate collected. The precipitate is extracted repeatedly with ether, the ether extracts washed and then dried. The ether is distilled to obtain 88.9 g. crude p-n-butoxyphenyl isothiocyanate. Distillation of the crude product in vacuo yields the pure p-n-butoxyphenyl isothiocyanate; B. P. 191.5–193° C. at 25.5 mm. of mercury.

By using the above procedure and substituting p-isobutoxyaniline one obtains p-isobutoxyphenyl isothiocyanate; B. P. 193–194° C. at 35 mm. of mercury.

34.04 g. of 2-p-aminophenylpyridine in 150 ml. of carbon disulfide is added with stirring of 30 ml. of concentrated ammonium hydroxide in 120 ml. of carbondisulfide, the mixture stirred at room temperature for three hours and then allowed to stand for sixty-four hours. The precipitate is collected, suspended in 400 ml. of water and 75.87 g. of lead acetate trihydrate in 400 ml. of distilled water added. The mixture is stirred for two hours, and the precipitate collected. The precipitate is extracted with three portions of ether, the ether extract dried and the ether distilled. Recrystallization of the residue from chloroform-isooctane mixture yields the desired p-2-pyridylphenyl isothiocyanate; M. P. 50–52° C.

I claim:

1. A 1 - (p - butoxyphenyl) - 3 - (p - pyridylphenyl)-2-thiourea of formula,

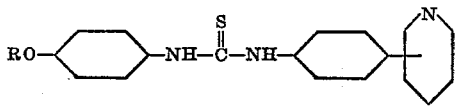

where R is a member of the class consisting of normal butyl and isobutyl groups.

2. 1 - (p - n - butoxyphenyl) - 3 - 2' - pyridylphenyl)-2-thiourea.

3. 1 - (p - isobutoxyphenyl) - 3 - (p-2'-pyridylphenyl)-2-thiourea.

4. 1 - (p - n - butoxyphenyl)-3-(p-3'-pyridylphenyl)-2-thiourea.

5. 1 - (p - isobutoxyphenyl) - 3 - (p-4'-pyridylphenyl)-2-thiourea.

6. 1 - (p - isobutoxyphenyl) - 3 - (p - 3' - pyridylphenyl)-2-thiourea.

References Cited in the file of this patent

UNITED STATES PATENTS

Re. 23,947    Fox _____ Feb. 15, 1955
2,702,821    Huebner et al. _____ Feb. 22, 1955